(12) United States Patent
Landry-Drolet et al.

(10) Patent No.: US 12,320,297 B2
(45) Date of Patent: Jun. 3, 2025

(54) AIRCRAFT POWER SYSTEM MODULE WITH INTEGRAL LUBRICANT RESERVOIR

(71) Applicant: Pratt & Whitney Canada Corp., Longueuil (CA)

(72) Inventors: Guillaume Landry-Drolet, Boucherville (CA); Michel Desjardins, Saint-Hubert (CA); Daniel Ouimette, Terrebonne (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/381,062

(22) Filed: Oct. 17, 2023

(65) Prior Publication Data

US 2025/0122834 A1     Apr. 17, 2025

(51) Int. Cl.
*F02C 7/06* (2006.01)
*B64C 27/00* (2006.01)
(Continued)

(52) U.S. Cl.
CPC ............... *F02C 7/06* (2013.01); *B64D 35/00* (2013.01); *F01D 15/08* (2013.01); *F02C 7/32* (2013.01);
(Continued)

(58) Field of Classification Search
CPC ..... B64C 29/0033; B64C 27/12; B64C 27/14; B64C 27/28; B64C 27/52; B64C 27/06;
(Continued)

(56) References Cited

U.S. PATENT DOCUMENTS 3,608,910 A    9/1971  Tyler
4,493,623 A    1/1985  Nelson
(Continued)

FOREIGN PATENT DOCUMENTS

JP      2016176536 A    10/2016
WO         9427050      11/1994

OTHER PUBLICATIONS

Rotorcraft Manufacturer's Data, Eagle Copters Ltd., Jan. 5, 2015, https://www.eaglecopters.com/wp-content/uploads/2022/11/56.-MD-E407-789-1-Rev-1.pdf.
(Continued)

*Primary Examiner* — Eric J Zamora Alvarez
(74) *Attorney, Agent, or Firm* — Getz Balich LLC

(57) ABSTRACT

A system is provided for an aircraft. This aircraft system includes a powertrain, a lubrication system and a casing. The powertrain includes a powerplant, a power transmission, a clutch system and a bladed rotor. The power transmission operatively couples the powerplant to the clutch system. The clutch system operatively couples the power transmission to the bladed rotor. The powerplant is configured to drive rotation of the bladed rotor through the power transmission and the clutch system when the clutch system is engaged. The lubrication system includes a lubricant reservoir and a lubricant circuit. The lubrication system is configured to direct lubricant from the lubricant reservoir to the powerplant and the power transmission through the lubricant circuit. The casing houses the power transmission and the lubricant reservoir.

20 Claims, 2 Drawing Sheets

(51) Int. Cl.
  *B64D 35/00* (2006.01)
  *F01D 15/08* (2006.01)
  *F02C 7/32* (2006.01)
  *F02C 7/36* (2006.01)

(52) U.S. Cl.
  CPC ............... *F02C 7/36* (2013.01); *B64C 27/00* (2013.01); *F05D 2260/4023* (2013.01); *F05D 2260/98* (2013.01)

(58) Field of Classification Search
  CPC ......... B64C 27/00; F01D 25/20; F01D 15/08; F01D 25/183; F01D 15/10; F01D 25/18; F01D 5/02; F01D 9/065; F01D 25/36; F02C 7/06; F02C 7/32; F02C 7/36; B64D 35/00; B64D 27/026; F05D 2260/98; F05D 2260/4023; F05D 2220/32; F05D 2240/60; F04D 29/063
  See application file for complete search history.

(56) References Cited

U.S. PATENT DOCUMENTS

| | | | |
|---|---|---|---|
| 4,829,850 A | 5/1989 | Soloy | |
| 5,192,084 A | 3/1993 | Norbury | |
| 8,313,281 B2 | 11/2012 | Rickert | |
| 8,870,699 B2 | 10/2014 | Lewis | |
| 9,708,074 B2 | 7/2017 | Jaenker | |
| 9,964,039 B2 * | 5/2018 | Parnin | F02C 7/06 |
| 9,964,184 B2 | 5/2018 | Modrzejewski | |
| 10,125,628 B2 * | 11/2018 | Nguyen | H02J 3/1885 |
| 10,329,955 B2 * | 6/2019 | Menheere | F02C 7/36 |
| 10,557,359 B2 | 2/2020 | Amador | |
| 10,946,954 B2 | 3/2021 | Ehinger | |
| 11,104,430 B2 | 8/2021 | Fenny | |
| 11,280,398 B2 * | 3/2022 | Parsons | F16H 57/0445 |
| 11,313,455 B2 | 4/2022 | Mueller | |
| 2017/0284535 A1 * | 10/2017 | Ehinger | B64C 27/14 |
| 2017/0327219 A1 * | 11/2017 | Alber | B64D 27/24 |
| 2018/0259060 A1 | 9/2018 | Poster | |
| 2020/0191276 A1 | 6/2020 | Kopp | |
| 2021/0403168 A1 * | 12/2021 | Parsons | B64D 27/02 |
| 2022/0397060 A1 * | 12/2022 | Winter | F02C 7/06 |
| 2023/0062203 A1 | 3/2023 | Wüstenberg | |

OTHER PUBLICATIONS

Trappmann K et al: "MTR390 A new generation turboshaft engine", Fifteenth European Rotorcraft Forum, Sep. 15, 1989 (Sep. 15, 1989), XP093252568.

EP Search Report for EP Patent Application No. 24207056.3 dated Mar. 12, 2025.

\* cited by examiner

AIRCRAFT POWER SYSTEM MODULE WITH INTEGRAL LUBRICANT RESERVOIR

TECHNICAL FIELD

This disclosure relates generally to an aircraft and, more particularly, to lubricating powertrain components of the aircraft.

BACKGROUND INFORMATION

Various systems and methods are known in the art for delivering lubricant to components of an aircraft. While these known lubricant delivery systems and methods have various benefits, there is still room in the art for improvement.

SUMMARY

According to an aspect of the present disclosure, a system is provided for an aircraft. This aircraft system includes a powertrain, a lubrication system and a casing. The powertrain includes a powerplant, a power transmission, a clutch system and a bladed rotor. The power transmission operatively couples the powerplant to the clutch system. The clutch system operatively couples the power transmission to the bladed rotor. The powerplant is configured to drive rotation of the bladed rotor through the power transmission and the clutch system when the clutch system is engaged. The lubrication system includes a lubricant reservoir and a lubricant circuit. The lubrication system is configured to direct lubricant from the lubricant reservoir to the powerplant and the power transmission through the lubricant circuit. The casing houses the power transmission and the lubricant reservoir.

According to another aspect of the present disclosure, another system is provided for an aircraft. This aircraft system includes a powertrain, a lubrication system and a casing. The powertrain includes a powerplant, a clutch system and a bladed rotor. The clutch system operatively couples the powerplant to the bladed rotor. The powerplant is configured to drive rotation of the bladed rotor through the clutch system when the clutch system is engaged. The lubrication system includes a lubricant reservoir and a lubricant circuit. The lubrication system is configured to direct lubricant from the lubricant reservoir to the powerplant and the clutch system through the lubricant circuit. The casing surrounds and/or forms a housing of the clutch system and the lubricant reservoir.

According to still another aspect of the present disclosure, another system is provided for an aircraft. This aircraft system includes a powertrain and a lubrication system. The powertrain includes a power geartrain, an accessory geartrain and a clutch system. The power geartrain is operatively coupled to the accessory geartrain and the clutch system. The lubrication system includes a lubricant reservoir, a lubricant circuit and a lubricant pump operatively coupled to the power geartrain through the accessory geartrain. The lubrication system is adapted to direct lubricant from the lubricant reservoir to the power geartrain, the accessory geartrain and the clutch system through the lubricant circuit using the lubricant pump. The power geartrain, the accessory geartrain and the clutch system are integrated within a casing.

The powertrain may also include a bladed rotor and a powerplant configured to drive rotation of the bladed rotor sequentially through the power geartrain and the clutch system.

The powertrain may also include a power geartrain and an accessory geartrain. The power geartrain may operatively couple the powerplant to the clutch system and the accessory geartrain. The lubrication system may also be configured to direct the lubricant from the lubricant reservoir to the power geartrain and/or the accessory geartrain through the lubricant circuit.

The powertrain may also include a power geartrain and an accessory geartrain. The power geartrain may operatively couple the powerplant to the clutch system and the accessory geartrain. The casing may also house the power geartrain and/or the accessory geartrain.

The powertrain may also include a power geartrain and an accessory geartrain. The power geartrain and the accessory geartrain may each be powered by the powerplant. The clutch system may be operatively coupled to the powerplant through the power geartrain. The casing may also house the power geartrain and/or the accessory geartrain.

The powerplant may be disposed outside of the casing.

The lubrication system may also be configured to direct the lubricant from the lubricant reservoir to the clutch system through the lubricant circuit.

The casing may also house the clutch system.

The power transmission may include a power geartrain and an accessory geartrain.

The power geartrain and the accessory geartrain may be housed within the casing. The power geartrain may operatively couple the powerplant to the clutch system.

The lubrication system may also include a pump driven by the powerplant through the accessory geartrain.

The pump may be configured to direct the lubricant from the lubricant reservoir to the powerplant and the power transmission through the lubricant circuit.

The pump may be configured to direct the lubricant from the powerplant and the power transmission back to the lubricant reservoir through the lubricant circuit.

The pump may be housed within or mounted to the casing.

The lubrication system may also be configured to direct the lubricant from the lubricant reservoir to the power geartrain, the accessory geartrain and the clutch system through the lubricant circuit.

The powerplant may be configured as or otherwise include an internal combustion engine.

The powerplant may be configured as or otherwise include a gas turbine engine.

The powerplant may be configured as or otherwise include an electric motor.

The system may also include a geartrain operatively coupling the clutch system to the bladed rotor.

The system may also include a second lubrication system fluidly coupled to and configured to deliver second lubricant to the geartrain.

The bladed rotor may be configured as or otherwise include a rotorcraft rotor. The aircraft may be configured as a rotorcraft.

The rotorcraft rotor may be a main rotorcraft rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
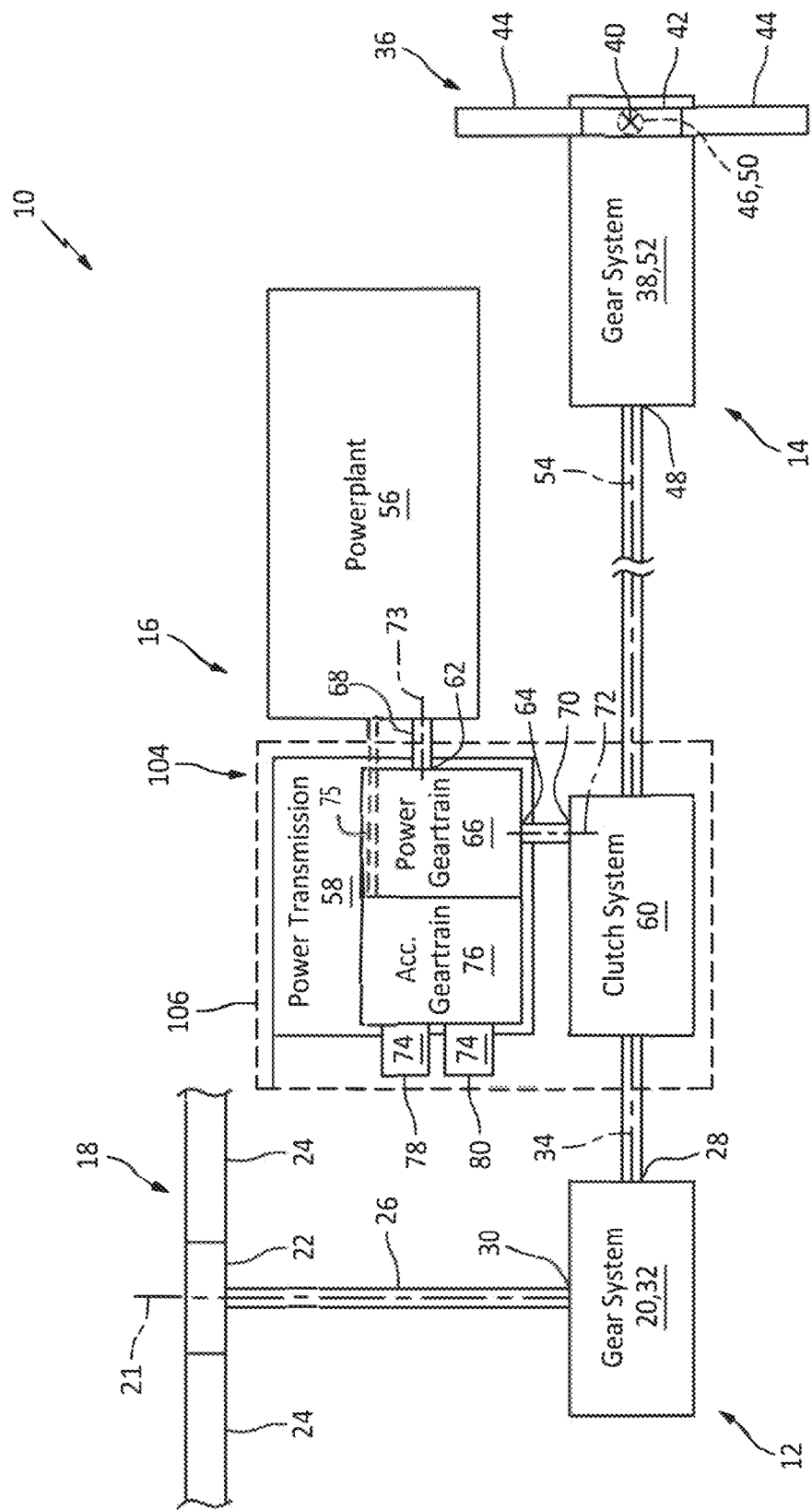
FIG. 1 is a partial schematic illustration of an aircraft powertrain.

FIG. 1 schematically illustrates a powertrain 10 for an aircraft such as a manned or unmanned rotorcraft; e.g., a helicopter, a drone, etc. The aircraft powertrain 10 includes one or more rotor systems 12 and 14 and a power system 16 for mechanically driving operation of the rotor systems 12 and 14.

The first rotor system 12 of FIG. 1 includes a first bladed rotor 18 (e.g., an air mover) and a first gear system 20. The first bladed rotor 18 may be configured as a main rotor for the aircraft (e.g., a rotorcraft main rotor), and the first gear system 20 may be configured as a main rotor gearbox of the aircraft powertrain 10.

The first bladed rotor 18 of FIG. 1 is configured to rotate about a first rotor axis 21 (e.g., a vertical axis) to generate aircraft lift and/or aircraft thrust. The first bladed rotor 18 includes a first rotor base 22 (e.g., a hub) and a plurality of first rotor blades 24 arranged circumferentially around, projecting radially out from and connected to the first rotor base 22.

The first gear system 20 is operatively coupled to the first bladed rotor 18 and its first rotor base 22 through at least one transmission device such as a first rotor shaft 26; e.g., a main rotor mast. The first gear system 20 of FIG. 1 includes an input 28, an output 30 and a geartrain 32; e.g., internal gearing. The first gear system input 28 is coupled to the power system 16. The first gear system output 30 is coupled to the first bladed rotor 18 through the first rotor shaft 26. The first gear system geartrain 32 couples the first gear system input 28 to the first gear system output 30. The first gear system geartrain 32 may be configured such that the first gear system input 28 is operable to rotate at a different (e.g., faster or slower) rotational speed than the first gear system output 30. The first gear system 20 may thereby be configured as a speed change device between the power system 16 and the first bladed rotor 18. The first gear system geartrain 32 may also (or alternatively) be configured to change a direction of power transmission through the first gear system 20. For example, the first gear system output 30 may rotate with the first bladed rotor 18 about the first rotor axis 21, and the first gear system input 28 may rotate about another axis 34 which is angularly offset from (e.g., perpendicular to) the first rotor axis 21. The present disclosure, however, is not limited to such an exemplary first gear system arrangement. The first gear system 20 and its first gear system geartrain 32, for example, may alternatively be configured such that the first gear system input 28 and the first gear system output 30 rotate at a common (the same) rotational speed.

The second rotor system 14 of FIG. 1 includes a second bladed rotor 36 (e.g., an air mover) and a second gear system 38. The second bladed rotor 36 may be configured as a tail rotor for the aircraft (e.g., a rotorcraft tail rotor), and the second gear system 38 may be configured as a tail rotor gearbox of the aircraft powertrain 10.

The second bladed rotor 36 of FIG. 1 is configured to rotate about a second rotor axis 40 (e.g., a horizontal axis) to generate lateral thrust to counteract a torque effect associated with rotation of the first bladed rotor 18. The second bladed rotor 36 includes a second rotor base 42 (e.g., a hub) and a plurality of second rotor blades 44 arranged circumferentially around, projecting radially out from and connected to the second rotor base 42.

The second gear system 38 is operatively coupled to the second bladed rotor 36 and its second rotor base 42 through at least one transmission device such as a second rotor shaft 46; e.g., a tail rotor shaft. The second gear system 38 of FIG. 1 includes an input 48, an output 50 and a geartrain 52; e.g., internal gearing. The second gear system input 48 is coupled to the power system 16. The second gear system output 50 is coupled to the second bladed rotor 36 through the second rotor shaft 46. The second gear system geartrain 52 couples the second gear system input 48 to the second gear system output 50. The second gear system geartrain 52 may be configured such that the second gear system input 48 is operable to rotate at a different (e.g., faster or slower) rotational speed than the second gear system output 50. The second gear system 38 may thereby be configured as a speed change device between the power system 16 and the second bladed rotor 36. The second gear system geartrain 52 may also (or alternatively) be configured to change a direction of power transmission through the second gear system 38. For example, the second gear system output 50 may rotate with the second bladed rotor 36 about the second rotor axis 40, and the second gear system input 48 may rotate about another axis 54 which is angularly offset from (e.g., perpendicular to) the second rotor axis 40. The present disclosure, however, is not limited to such an exemplary second gear system arrangement. The second gear system 38 and its second gear system geartrain 52, for example, may alternatively be configured such that the second gear system input 48 and the second gear system output 50 rotate at a common (the same) rotational speed. Moreover, in other embodiments, the second rotor shaft 46 may be omitted and the second bladed rotor 36 may be connected (e.g., directly) to the second gear system output 50.

The power system 16 of FIG. 1 includes an aircraft powerplant 56, a power transmission 58 and a clutch system 60. The aircraft powerplant 56 may be configured as or otherwise include a gas turbine engine (e.g., a turboshaft engine), a rotary engine (e.g., a Wenkel engine) or any other type of internal combustion engine capable of generating mechanical power for driving rotation of the bladed propulsor rotors 18 and 36. The aircraft powerplant 56 may alternatively be configured as or otherwise include a hybrid powerplant which includes an internal combustion engine and one or more electric motors, or a full electric powerplant which includes one or more electric motors.

The power transmission 58 is configured to operatively couple the aircraft powerplant 56 to the clutch system 60. The power transmission 58 of FIG. 1, for example, includes an input 62, an output 64 and a power geartrain 66; e.g., internal gearing such as an epicyclic gear system or another type of non-epicyclic gear system. The power transmission input 62 is coupled to an output 68 (e.g., an output shaft) from the aircraft powerplant 56. The power transmission output 64 is coupled to an input 70 into the clutch system 60. The power geartrain 66 couples the power transmission input 62 to the power transmission output 64. The power geartrain 66 may be configured such that the power transmission input 62 is operable to rotate at a different (e.g., faster or slower) rotational speed than the power transmission output 64. This power transmission 58 and its power geartrain 66 may thereby be configured as a speed change device between the aircraft powerplant 56 and the clutch system 60. The power geartrain 66 may also (or alternatively) be configured to change a direction of power transmission through the power transmission 58. For example, the power transmission output 64 may rotate about an output axis 72, and the power transmission input 62 may rotate about an input axis 73 which is angularly offset from (e.g., perpendicular to) the output axis 72. The present disclosure, however, is not limited to such an exemplary power transmission arrangement. The power transmission 58 and its power geartrain 66, for example, may alternatively be configured such that the power transmission input 62 and the power transmission output 64 rotate about a common (the same) axis or parallel axes.

The power transmission 58 may also be configured to operatively couple the aircraft powerplant 56 to one or more external devices 74; e.g., power system accessories, etc. The power transmission 58 of FIG. 1, for example, also includes an accessory geartrain 76; e.g., an accessory gearbox, etc. This accessory geartrain 76 may be driven by the aircraft powerplant 56, for example through a power takeoff from the power geartrain 66 or another (e.g., coaxial, concentric) power takeoff from the aircraft powerplant 56 (e.g., where the powerplant 56 is a gas turbine engine), schematically shown by dashed line 75. Alternatively, the accessory geartrain 76 may be integrated with or included as a part of the power geartrain 66. A gear of the accessory geartrain 76, for example, may be meshed with a gear of the power geartrain 66. The accessory geartrain 76 is thereby configured to distribute mechanical accessory/supplemental power generated by the aircraft powerplant 56 to the one or more external devices 74. One of the external devices 74 may be configured as a lubricant source pump 78. Another one of the external devices 74 may be configured as a lubricant return pump 80. The present disclosure, however, is not limited to such exemplary external devices. Examples of other external devices 74 include a generator, a starter motor, a motor-generator, a fuel pump, a hydraulic pump, and the like.

The clutch system 60 is configured to operatively couple the power transmission 58 and its power geartrain 66 to the first rotor system 12 and/or the second rotor system 14. The clutch system 60 of FIG. 1, for example, is configured to operatively couple the power transmission output 64 to the first gear system input 28 and/or the second gear system input 48 when a clutch or clutches within the clutch system 60 are engaged. The clutch system 60 of FIG. 1, for example, is configured to operatively couple the power transmission output 64 to the first gear system input 28 and the second gear system input 48 when a clutch or clutches within the clutch system 60 are engaged. The clutch system 60 of FIG. 1 is configured to decouple the power transmission output 64 from the first gear system input 28 and the second gear system input 48 when the clutch or the clutches within the clutch system 60 are disengaged. With this arrangement, the first bladed rotor 18 and/or the second bladed rotor 36 may rotate independent of the powerplant when the clutch system 60 is disengaged.

Figure 2:
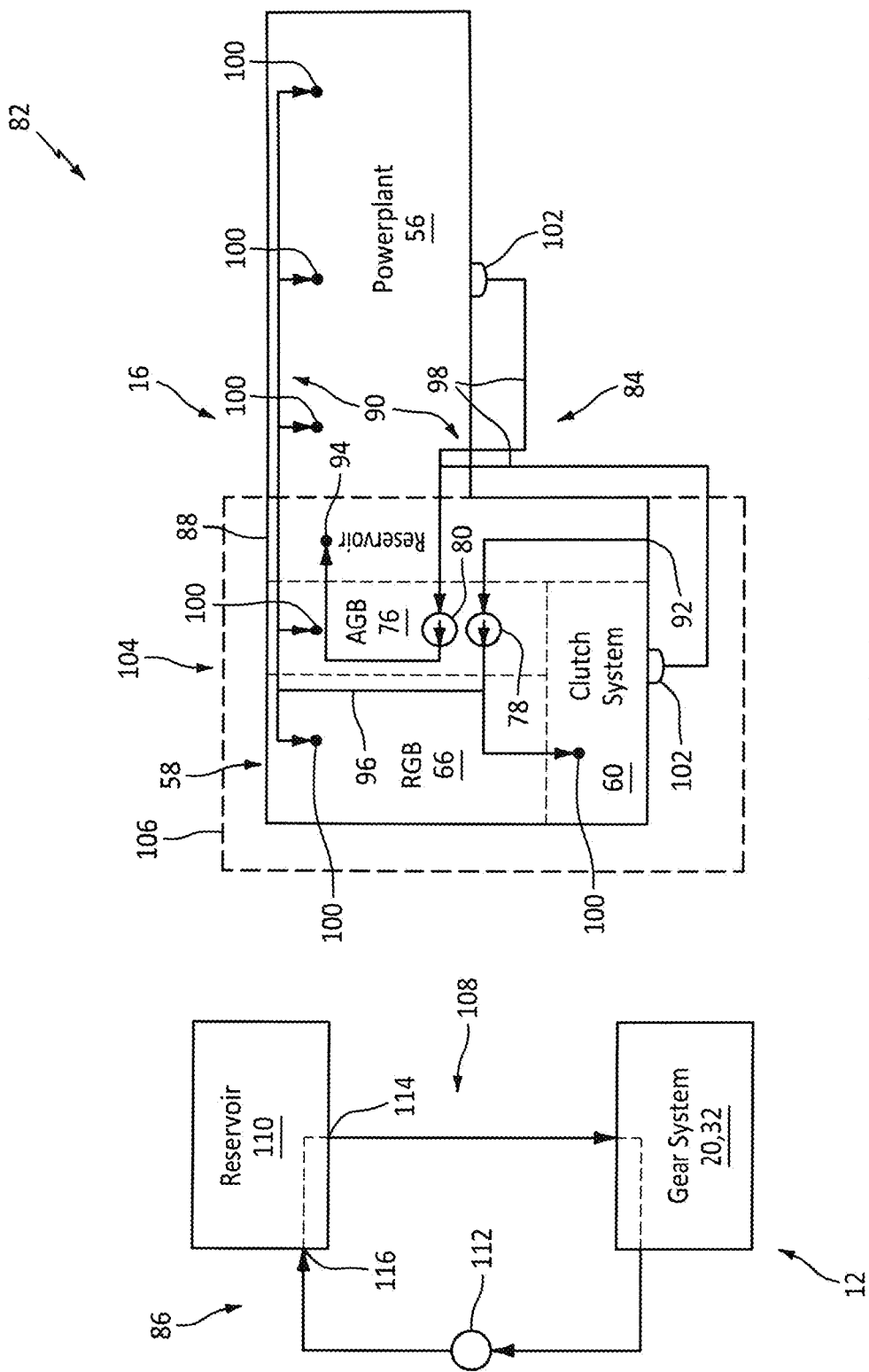
FIG. 2 is a partial schematic illustration of an aircraft system which includes its powertrain and one or more lubrication systems.

FIG. 2 schematically illustrates a system 82 of the aircraft which includes the aircraft powertrain 10 (see FIG. 1) and its members 20, 56, 58 and 60 arranged with one or more lubrication systems 84 and 86. The power system lubrication system 84 is configured to service (e.g., lubricate, cool, etc.) at least (or only) the power system 16. The rotor system lubrication system 86 is configured to service (e.g., lubricate, cool, etc.) at least (or only) the first rotor system 12. These lubrication systems 84 and 86, however, are configured fluidly independent of one another. The power system lubrication system 84, for example, does not provide lubricant to nor receive lubricant from the rotor system lubrication system 86. Similarly, the rotor system lubrication system 86 does not provide lubricant to nor receive lubricant from the power system lubrication system 84. Each of the lubrication system 84, 86 may thereby circulate is own discrete lubricant, where the lubricants circulated within the lubrication systems 84 and 86 may be a common type of lubricant or different types of lubricant.

The power system lubrication system 84 is fluidly coupled with and configured to deliver its lubricant to the power system members 56, 58 and 60. The power system lubrication system 84 of FIG. 2, for example, includes a power system lubricant reservoir 88, the source pump 78, the return pump 80 and a power system lubricant circuit 90. This power system lubrication system 84, of course, may also include various other fluid system components, which are not shown in FIG. 2 for clarity of illustration. Examples of these other fluid system components include, but are not limited to, one or more lubrication jets, one or more internal passages, one or more filters, one or more sensors, one or more additional pumps, one or more valves, one or more heat exchangers, and the like.

The power system lubricant reservoir 88 is configured to store a quantity of the lubricant before, during and/or after aircraft system operation. The power system lubricant reservoir 88, for example, may be configured as or otherwise include a tank, a cylinder, a pressure vessel, a bladder or any other type of lubricant storage container. The power system lubricant reservoir 88 includes an outlet 92 from an internal cavity of the power system lubricant reservoir 88 and an inlet 94 into the internal cavity of the power system lubricant reservoir 88. The power system lubricant reservoir 88 of FIG. 2 is configured integral within walls of the power system 16.

The power system lubricant circuit 90 may include one or more sub-circuits, which sub-circuits of FIG. 2 include a lubricant source circuit 96 and a lubricant return circuit 98. The lubricant source circuit 96 fluidly couples and extends longitudinally between the outlet 92 of the power system lubricant reservoir 88 and one or more lubricant feeds 100; e.g., outlets, nozzles, jets, etc. These lubricant feeds 100 are configured to inject, spray and/or otherwise deliver the lubricant to one or more or all of the power system components 56, 58, 60, 66 and 76. More particularly, the lubricant feeds 100 are configured to deliver the lubricant to various internal components of the power system components 56, 58, 60, 66 and 76. Examples of these internal components include, but are not limited to, bearings, meshing gears, dampers, and the like. The source pump 78 is fluidly coupled inline with the lubricant source circuit 96 between the power system lubricant reservoir 88 and the lubricant feeds 100. The source pump 78 may thereby direct (e.g., pump) the lubricant through the lubricant source circuit 96 from the power system lubricant reservoir 88 to the lubricant feeds 100 for lubricating, cooling and/or otherwise servicing various internal components within the power system members 56, 58, 60, 66 and 76.

The lubricant return circuit 98 fluidly couples and extends longitudinally between various lubricant collection devices 102 (e.g., sumps, gutters, etc.) and the inlet 94 of the power system lubricant reservoir 88. The return pump 80 is fluidly coupled inline with the lubricant return circuit 98 between the lubricant collection devices 102 and the power system lubricant reservoir 88. The return pump 80 may thereby direct (e.g., pump) the lubricant through the lubricant return circuit 98 from the lubricant collection devices 102 to the power system lubricant reservoir 88. Alternatively, the return pump 80 may be omitted and the lubricant may be directed through the lubricant return circuit 98 from the lubricant collection device 102 to the power system lubricant reservoir 88 by gravity.

At least some members of the power system 16 and the power system lubrication system 84 are arranged together in a power system module 104. The power system module 104 of FIG. 2 includes the power transmission 58 and its power geartrain 66 and its accessory geartrain 76, the clutch system 60, the power system lubricant reservoir 88 and an outer casing 106. This power system module 104 may also include one or more of the external devices 74 (see FIG. 1) arranged with the accessory geartrain 76; e.g., the source pump 78 and/or the return pump 80. The outer casing 106 houses at least some or all of the power system module members 58, 60, 66, 76, 78, 80 and 88. The outer casing 106 of FIG. 2, for example, extends around and may encapsulate each of the power system members 58, 60, 66, 76, 78, 80 and 88 within an interior of the outer casing 106. This outer casing 106 may be formed by one or more parts (e.g., casing sections, walls, etc.) attached and sealed together to provide a sealed, multi-part casing. In other embodiments, however, one or more of the power system module members may alternatively be arranged partially or completely outside of the outer casing 106. One or more of the external devices 74 such as the source pump 78 and/or the return pump 80, for example, may be mounted to an exterior of the outer casing 106.

Arranging the various members 58, 60, 66, 76, 78, 80 and 88 together into the power system module 104 may facilitate a reduction of parts included in the aircraft system 82. For example, by arranging the power system members 58, 60, 66, 76, 78, 80 and 88 with the common outer casing 106, inter-member seals, transmission devices, and the like may be reduced or omitted. Various power system module members may share common bearings, seals, lubricant conduits for the power system lubricant circuit 90, and the like. Housing the various power system module members together within (and/or otherwise mounted to) the common outer casing 106 may reduce installation and/or removal time. Provision of the power system module 104 may thereby facilitate a weight reduction, a size reduction and/or a cost reduction of the power system 16 and/or the power system lubrication system 84.

The rotor system lubrication system 86 is fluidly coupled with and configured to deliver its lubricant to at least (or only) the first gear system 20. The rotor system lubrication system 86 of FIG. 2, for example, includes a rotor system lubricant circuit 108, a rotor system lubricant reservoir 110 and a rotor system lubricant pump 112. This rotor system lubrication system 86, of course, may also include various other fluid system components, which are not shown in FIG. 2 for clarity of illustration. Examples of these other fluid system components include, but are not limited to, one or more filters, one or more sensors, one or more additional pumps, one or more valves, one or more heat exchangers, and the like.

The rotor system lubricant circuit 108 extends longitudinally through the first rotor system 12 and its first gear system geartrain 32 from an outlet 114 from the rotor system lubricant reservoir 110 to an inlet 116 into the rotor system lubricant reservoir 110. The rotor system lubricant pump 112 is fluidly coupled inline with the rotor system lubricant circuit 108 between the rotor system lubricant reservoir 110 and its outlet 114 and the first rotor system 12 and its first gear system geartrain 32. The rotor system lubricant pump 112 is configured to circulate (e.g., pump) the lubricant through the rotor system lubrication system 86 and its first gear system 20 to lubricant, cool and/or otherwise service the rotor system lubrication system 86 and its first gear system 20.

While the aircraft powertrain 10 is described above with a single first rotor system 12 and a single second rotor system 14, the present disclosure is not limited to such an exemplary arrangement. The aircraft powertrain 10, for example, may alternatively include multiple of the first rotor systems 12. With such an arrangement, the second rotor system 14 may be omitted as torque from the one of the first rotor systems 12 may counteract torque from another one of the first rotor systems 12. Moreover, while the aircraft is generally described above as a rotorcraft, it is contemplated the lubrication systems 84 and 86 may also be utilized for other types of aircraft.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for a rotorcraft, comprising:
a powertrain including a powerplant, a power transmission, a clutch system, a bladed rotor and a second bladed rotor, the power transmission operatively coupling the powerplant to the clutch system, the clutch system operatively coupling the power transmission to the bladed rotor and the second bladed rotor, the bladed rotor comprising a main rotorcraft rotor, the second bladed rotor comprising a tail rotor, and the powerplant configured to drive rotation of the bladed rotor and the second bladed rotor through the power transmission and the clutch system when the clutch system is engaged;
a lubrication system comprising a lubricant reservoir and a lubricant circuit, the lubrication system configured to direct lubricant from the lubricant reservoir to the powerplant and the power transmission through the lubricant circuit;
a geartrain operatively coupling the clutch system to the bladed rotor;
a second geartrain operatively coupling the clutch system to the second bladed rotor; and
a casing housing the power transmission and the lubricant reservoir.

2. The system of claim 1, wherein the powerplant is disposed outside of the casing.

3. The system of claim 1, wherein the lubrication system is further configured to direct the lubricant from the lubricant reservoir to the clutch system through the lubricant circuit.

4. The system of claim 1, wherein the casing further houses the clutch system.

5. The system of claim 1, wherein
the power transmission includes a power geartrain and an accessory geartrain;
the power geartrain and the accessory geartrain are housed within the casing; and
the power geartrain operatively couples the powerplant to the clutch system.

6. The system of claim 5, wherein the lubrication system further includes a pump driven by the powerplant through the accessory geartrain.

7. The system of claim 6, wherein the pump is configured to direct the lubricant from the lubricant reservoir to the powerplant and the power transmission through the lubricant circuit.

8. The system of claim 6, wherein the pump is configured to direct the lubricant from the powerplant and the power transmission back to the lubricant reservoir through the lubricant circuit.

9. The system of claim 6, wherein the pump is housed within or mounted to the casing.

10. The system of claim 5, wherein the lubrication system is further configured to direct the lubricant from the lubricant reservoir to the power geartrain, the accessory geartrain and the clutch system through the lubricant circuit.

11. The system of claim 1, wherein the powerplant comprises an internal combustion engine.

12. The system of claim 1, wherein the powerplant comprises an electric motor.

13. A system for a helicopter, comprising:
a powertrain including a powerplant, a power geartrain, a clutch system, a main rotor and a tail rotor, the clutch system operatively coupling the powerplant to the main rotor and the tail rotor, and the powerplant configured to drive rotation of the main rotor and the tail rotor through the clutch system when the clutch system is engaged;
the power geartrain operatively coupling the powerplant to the clutch system, and the power geartrain including an input coupled to an output shaft of the powerplant;
a lubrication system comprising a lubricant reservoir and a lubricant circuit, the lubrication system configured to direct lubricant from the lubricant reservoir to the powerplant and the clutch system through the lubricant circuit; and
a casing surrounding and/or forming a housing of the power geartrain, the clutch system, and the lubricant reservoir, and the powerplant disposed outside of the casing.

14. The system of claim 13, wherein
the powertrain further includes an accessory geartrain;
the power geartrain operatively couples the powerplant to the clutch system and the accessory geartrain; and
the lubrication system is further configured to direct the lubricant from the lubricant reservoir to at least one of the power geartrain or the accessory geartrain through the lubricant circuit.

15. The system of claim 13, wherein
the powertrain further includes an accessory geartrain;
the power geartrain operatively couples the powerplant to the clutch system and the accessory geartrain; and
the casing further houses the accessory geartrain.

16. The system of claim 13, wherein
the powertrain further includes an accessory geartrain;
the power geartrain and the accessory geartrain are each powered by the powerplant;
the clutch system is operatively coupled to the powerplant through the power geartrain; and
the casing further houses the accessory geartrain.

17. A system for an aircraft, comprising:
a powertrain including a power geartrain, an accessory geartrain and a clutch system, the power geartrain operatively coupled to the accessory geartrain and the clutch system;
a geartrain operatively coupling the clutch system to a bladed rotor; and
a lubrication system comprising a lubricant reservoir, a lubricant circuit and a lubricant pump operatively coupled to the power geartrain through the accessory geartrain, the lubrication system adapted to direct lubricant from the lubricant reservoir to the power geartrain, the accessory geartrain and the clutch system through the lubricant circuit using the lubricant pump, the lubrication system fluidly independent of the geartrain;
the power geartrain, the accessory geartrain and the clutch system integrated within a casing.

18. The system of claim 17, wherein the casing is formed by one or more casing sections.

19. The system of claim 17, wherein the power geartrain, the accessory geartrain and the clutch system integrated within the casing share at least one of: bearings, seals, or lubricant conduits.

20. The system of claim 17, wherein the casing is disposed within the aircraft.

* * * * *